United States Patent
Bigsby

[11] Patent Number: 5,664,536
[45] Date of Patent: Sep. 9, 1997

[54] SELF-LOCATING PISTON RING FOR A TWO-STROKE ENGINE

[75] Inventor: Bryan D. Bigsby, Fond du Lac, Wis.

[73] Assignee: Brunswick Corporation, Lake Forest, Ill.

[21] Appl. No.: 702,403

[22] Filed: Aug. 14, 1996

[51] Int. Cl.$^6$ ............................. F16J 9/16; F16J 15/32
[52] U.S. Cl. ................. 123/193.4; 277/103; 277/215; 277/216; 92/165 PR
[58] Field of Search ....................... 123/193.4, 193.6; 277/215, 216, 103, 27; 92/165 PR

[56] References Cited

U.S. PATENT DOCUMENTS

| 1,369,592 | 2/1921 | White | 277/215 |
|---|---|---|---|
| 1,499,571 | 7/1924 | Davis | 277/216 |
| 2,119,633 | 6/1938 | Edwards | 277/215 |
| 3,198,531 | 8/1965 | Brenneke | 277/215 |
| 3,920,254 | 11/1975 | Johnston et al. | 277/215 |
| 4,540,185 | 9/1985 | Hoult | 277/216 |
| 4,681,326 | 7/1987 | Kubo | 277/103 |
| 4,934,350 | 6/1990 | Lassanske | 92/165 PR |
| 5,253,877 | 10/1993 | DeBiasse et al. | 277/27 |
| 5,308,089 | 5/1994 | Ishida | 277/215 |
| 5,476,076 | 12/1995 | Zhou | 123/193.4 |

FOREIGN PATENT DOCUMENTS

| 1776219 | 11/1978 | Germany | 123/193.4 |

Primary Examiner—David A. Okonsky
Attorney, Agent, or Firm—Andrus, Sceales, Starke & Sawall

[57] ABSTRACT

A self-locating piston ring for a piston of a two-stroke engine. The piston is slidable in the cylinder bore of a two-stroke engine and is provided with a circumferential groove. A recess extends radially inward from a portion of the groove. A split piston ring is located in the groove of the piston, and the piston ring is provided with a tab which extends radially inward and is received within the recess, thereby preventing rotation of the piston ring relative to the piston.

7 Claims, 1 Drawing Sheet

SELF-LOCATING PISTON RING FOR A TWO-STROKE ENGINE

BACKGROUND OF THE INVENTION

In a typical four-stroke internal combustion engine, the piston rings are freely rotatable within grooves in the pistons. However, in a two-stroke engine, it is important to lock the piston ring in the piston groove, so that the piston ring will not rotate relative to the piston. If the piston ring is able to rotate freely within the groove in the piston of the two-stroke engine, one or both of the ends of the split ring could expand outwardly into an open scavenging port, causing the ring to break off and jam between the piston and cylinder wall, resulting in severe damage to the engine.

In the past, the conventional manner of locking the piston ring to the piston in a two-stroke engine was to press a small diameter locating pin into a radially extending hole in the bottom of the groove of the piston, and a notch, cut into the piston ring end gap, engaged the projecting end of the pin. With this construction, it was found that failure could occur when the piston was exposed to high compression temperatures that act to soften the piston material surrounding the locating pin, resulting in the pin becoming loose. This problem was compounded by side loads imparted by the ring acting against the pin during operation of the engine. Thus, the combination of high temperatures along with side pounding loads often resulted in breakage of the pin, or the pin being pounded deeper into the piston, until it no longer protruded into the ring gap. When this condition occurred, the piston ring could then rotate freely and the ends of the split ring could deflect outwardly into an open scavenging port to cause severe engine damage, as previous described.

SUMMARY OF THE INVENTION

The invention is directed to an improved self-locating piston ring for a two-stroke engine.

In accordance with the invention, the piston, which is slidable in a cylinder bore of the two-stroke engine, is provided with a circumferential groove, and a recess extends radially inward from a portion of the bottom of the groove. Mounted in the groove is a split piston ring and the inner diameter surface of the ring is formed with an inwardly extending tab which mates with and complements the recess in the bottom of the groove. The engagement of the tab with the recess prevents rotation of the ring relative to the piston.

The piston ring locking mechanism of the invention eliminates locating pin failures that have been a serious problem in high performance two-stroke engines in the past.

As a further advantage, the self-locating piston ring of the invention has no attached or auxiliary pieces which can become loose during operation of the engine. Moreover, the surface area of the integral tab on the piston ring is designed to be large enough to accommodate side-to-side pounding loads during operation of the engine without deforming the recess in the bottom of the piston groove.

Other objects and advantages will appear during the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
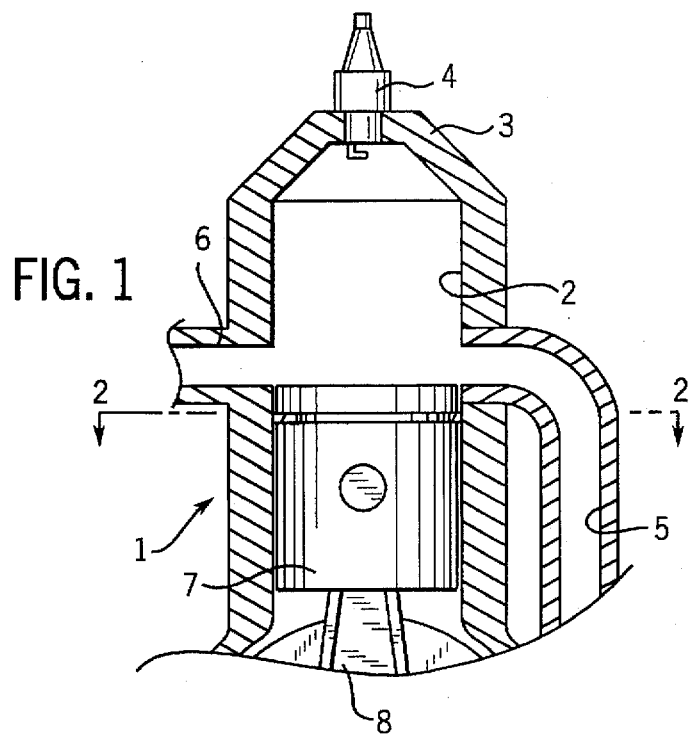
FIG. 1 is a longitudinal section of a portion of a typical two-stroke internal combustion engine incorporating the invention.

FIG. 1 illustrates a portion of the engine block 1 of a typical two-stroke internal combustion engine. Engine block 1 includes a cylinder bore 2, the upper end of which is enclosed by a head 3 and a spark plug 4 is mounted in the head. A scavenging port 5 communicates with the central portion of the cylinder bore and extends downwardly through the block to the crankcase. Also connected to bore 2 is exhaust port 6.

Figure 2:
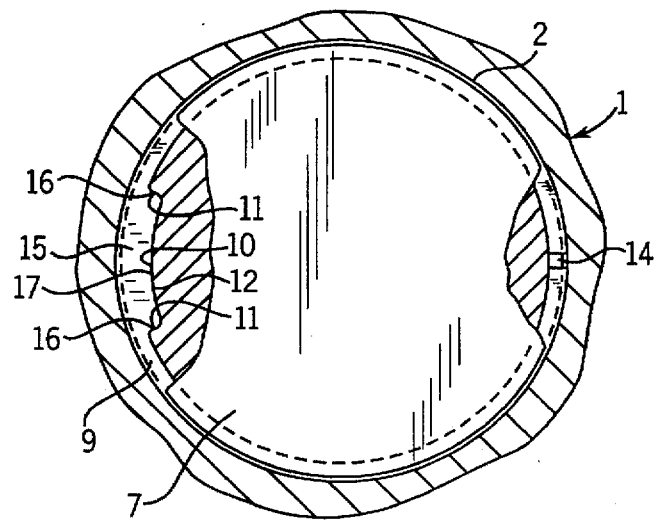
FIG. 2 is a top plan view of the piston with parts broken away in section.

Mounted for sliding movement in cylinder bore 2 is a piston 7 that is connected to a piston rod 8. The periphery of piston 7 is formed with a circumferential groove 9 which extends around the entire periphery of piston 7, as illustrated in FIG. 2. Formed in the bottom of groove 9 is a recess or slot 10, and recess 10 is preferably bordered by a pair of radially extending sides 11 and a base 12. In practice, recess 10 extends through an arc of about 30° to 60° and preferably through an arc of about 45°.

Figure 3:
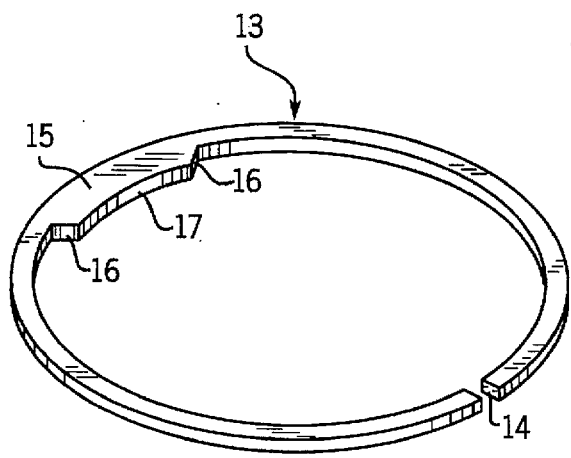
FIG. 3 is a perspective view of the piston ring

Mounted in groove 9 is a split piston ring 13 and the free ends of the ring are separated by a gap 14. As best shown in FIG. 3, a tab 15 is formed integrally with ring 13 and extends inwardly from the inner diameter surface of the ring. Tab 15, as illustrated, is bordered by a pair of radially extending edges 16 and an inner circumferential edge 17.

Tab 15 is formed with a configuration to mate with and complement recess 10 in groove 9, and the engagement of the tab with the recess prevents relative rotation of the piston ring 13 during operation of the engine. While the drawings show the side edges 16 of the tab 15 and the sides 11 of the recess 10 extending in a radial direction, it is contemplated that the radial arrangement is not critical and the complementary edges 16 and sides 11 can have other configurations, as long as the tab can fit into the recess and prevent rotation of the ring 13.

With the construction of the invention, the piston ring 13 is locked against rotation relative to the piston without the use of any auxiliary components which could become loose or deformed during operation of the engine. The engagement of side edges 16 of the tab 15 with the sides 11 of the recess 10 accommodate side loads that are encountered during operation of the engine.

I claim:

1. In a two-stroke internal combustion engine, an engine block having a cylinder bore, a piston slidable in said bore and having a circumferential groove, said groove being bordered by a pair of side walls and a bottom wall, said piston also having a recess extending radially inward from the bottom wall of said groove, a split piston ring disposed in the groove and having an inner diameter surface and an outer diameter surface, and a tab extending radially inward from said inner diameter surface and received within said recess, engagement of said tab with said recess preventing rotation of said piston ring relative to said piston.

2. The engine of claim 1, wherein said recess and said tab both extend circumferentially through an arc of about 30° to 60°.

3. The engine of claim 1, wherein said recess is bordered by a pair of radially extending sides and said tab is bordered by a pair of radially extending side edges that are engaged with the respective sides.

4. The engine of claim 1, wherein said split piston ring has a pair of free ends spaced apart at a gap, said gap being located diametrically opposite said tab.

5. In a two-stroke internal combustion engine, an engine block having a cylinder bore and having a scavenger port communicating with said bore, a piston slidable within said bore and having a circumferential groove, said groove being bordered by a pair of side walls and a bottom wall, said piston also having a recess extending radially inward from the bottom wall of said groove, said recess extending through an arc of about 30° to 60°, and a split piston ring disposed in the groove and having an inner diameter surface and an outer diameter surface, said ring including a tab extending radially inward from said inner diameter surface and engaged with said recess, said tab mating with and complementing said recess to thereby prevent rotation of said ring relative to said piston.

6. The engine of claim 5, wherein said recess is bordered by a pair of radially extending sides and said tab is bordered by a pair of radially extending side edges that are engaged with the sides of the recess.

7. The engine of claim 5, wherein said piston ring is provided with a pair of free abutting ends, said ends being spaced apart by a gap, said gap being located diametrically opposite said tab.

\* \* \* \* \*